US008108078B2

(12) United States Patent
Lorenz (10) Patent No.: US 8,108,078 B2
(45) Date of Patent: *Jan. 31, 2012

(54) INTEGRATED ACTUATOR COIL AND DECODER MODULE FOR IRRIGATION CONTROL

(75) Inventor: Michael A. Lorenz, Alta Loma, CA (US)

(73) Assignee: Rain Bird Corporation, Azusa, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/886,471

(22) Filed: Sep. 20, 2010

(65) Prior Publication Data
US 2011/0015794 A1    Jan. 20, 2011

Related U.S. Application Data

(63) Continuation of application No. 11/228,413, filed on Sep. 15, 2005, now Pat. No. 7,826,931.

(51) Int. Cl.
*G06F 19/00* (2006.01)

(52) U.S. Cl. .......................................... 700/284; 239/63

(58) Field of Classification Search .................. 700/284, 700/16, 19, 282–283; 239/63, 68, 69, 70; 137/624.2, 78.3
See application file for complete search history.

(56) References Cited

U.S. PATENT DOCUMENTS

| 3,547,154 A | 12/1970 | Benham |
| 3,729,710 A | 4/1973 | Sherwin |
| 3,747,620 A | 7/1973 | Kah |
| 3,989,066 A | 11/1976 | Sturman |
| 4,007,458 A | 2/1977 | Hollabaugh |
| 4,121,114 A | 10/1978 | Ruggles |
| 4,131,882 A | 12/1978 | Hollabaugh |
| 4,165,532 A | 8/1979 | Kendall |
| 4,176,395 A | 11/1979 | Evelyn-Veere |
| 4,241,375 A | 12/1980 | Ruggles |
| 4,423,484 A | 12/1983 | Hamilton |
| 4,535,401 A | 8/1985 | Penn |
| 4,548,225 A | 10/1985 | Busalacchi |
| 4,562,506 A | 12/1985 | Moran |
| 4,645,882 A | 2/1987 | Nakayama |
| 4,716,490 A | 12/1987 | Alexanian |

(Continued)

FOREIGN PATENT DOCUMENTS

GB    2177582    1/1987

(Continued)

OTHER PUBLICATIONS

Michrochip Technology Inc.; *PIC/16F631/677/685/687,689/690 Data Sheet*; 20-Pin Flash-Based, 8-Bit CMOS Microcontollers with Nano Watt Technology; 2006; 294 pages.
Rain Bird, "FD Field Decoders: Rain Bird Decoders", Feb. 17, 2005, pp. 1-4, printed from www.rainbird.com/golf/products/centralcontrol/decoders.htm, Rain Bird Corporation, Glendora, CA.
Rain Bird, "Full/Part Circle Roters", Oct. 2004, pp. 1-4, Catalog No. 438, Rain Bird Corporation, Glendora, CA.

(Continued)

*Primary Examiner* — Kidest Bahta
(74) *Attorney, Agent, or Firm* — Fitch Even Tabin & Flannery (57) ABSTRACT

An integrated actuator coil and decoder module for use in decoder-based irrigation control systems, and related methods of manufacture and installation, are provided herein. In one implementation, an irrigation control device comprises a body, decoder circuitry located within the body, a coil located within the body and coupled to the decoder circuitry, the coil adapted to develop an electromagnetic flux sufficient to cause actuation of a device controlling irrigation equipment in response to signaling from the decoder circuitry. Also included is an electrical connection coupled to the decoder circuitry and adapted to couple to a control wire path of a decoder-based irrigation control system. The decoder circuitry and the coil are integrated into a single device.

26 Claims, 8 Drawing Sheets

U.S. PATENT DOCUMENTS

| | | | |
|---|---|---|---|
| 4,718,454 | A | 1/1988 | Appleby |
| 4,777,556 | A | 10/1988 | Imran |
| 4,811,221 | A | 3/1989 | Sturman |
| 5,021,939 | A | 6/1991 | Pulgiese |
| 5,048,755 | A | 9/1991 | Dodds |
| 5,079,667 | A | 1/1992 | Kasano |
| 5,100,056 | A | 3/1992 | Theodorsen |
| 5,229,649 | A | 7/1993 | Nielsen |
| 5,251,153 | A | 10/1993 | Nielsen |
| 5,333,785 | A | 8/1994 | Dodds |
| 5,347,421 | A | 9/1994 | Alexanian |
| 5,402,303 | A | 3/1995 | Luck |
| 5,485,400 | A | 1/1996 | Warrior |
| 5,655,561 | A | 8/1997 | Wendel |
| 5,661,349 | A | 8/1997 | Luck |
| 5,740,031 | A | 4/1998 | Gagnon |
| 5,760,706 | A | 6/1998 | Kiss |
| 5,780,938 | A | 7/1998 | Edwards |
| 5,825,664 | A | 10/1998 | Warrior |
| 5,826,619 | A | 10/1998 | Roman |
| 5,839,658 | A | 11/1998 | Sarver |
| 5,848,609 | A | 12/1998 | Marchesseault |
| 5,914,847 | A | 6/1999 | Alexanian |
| 5,938,172 | A | 8/1999 | Ohtsuka |
| 6,021,038 | A | 2/2000 | Hanchett, Jr. |
| 6,126,141 | A | 10/2000 | Geiger |
| 6,154,354 | A | 11/2000 | Alexanian |
| 6,283,139 | B1 | 9/2001 | Symonds |
| 6,335,855 | B1 | 1/2002 | Alexanian |
| 6,337,635 | B1 | 1/2002 | Ericksen |
| 6,351,366 | B1 | 2/2002 | Alexanian |
| 6,378,838 | B1 | 4/2002 | Brundisini |
| 6,460,563 | B2 | 10/2002 | Olson |
| 6,652,188 | B1 | 11/2003 | Albright |
| 6,694,223 | B1 | 2/2004 | Goldberg |
| 6,721,630 | B1 | 4/2004 | Woytowitz |
| 6,763,287 | B2 | 7/2004 | Brundisini |
| 6,766,221 | B1 | 7/2004 | Christiansen |
| 6,782,310 | B2 | 8/2004 | Bailey |
| 6,782,311 | B2 | 8/2004 | Barlow |
| 6,783,287 | B2 | 8/2004 | Kudo |
| 6,812,826 | B2 | 11/2004 | Buhler |
| 6,842,667 | B2 | 1/2005 | Beutler |
| 6,898,467 | B1 | 5/2005 | Smith |
| 6,948,697 | B2 | 9/2005 | Herbert |
| 6,993,416 | B2 | 1/2006 | Christiansen |
| 7,058,479 | B2 | 6/2006 | Miller |
| 7,069,115 | B1 | 6/2006 | Woytowitz |
| 7,084,741 | B2 | 8/2006 | Plummer |
| 7,146,225 | B2 | 12/2006 | Guenst |
| 7,146,255 | B2 | 12/2006 | Christiansen |
| 7,181,319 | B1 | 2/2007 | Woytowtiz |
| 7,182,272 | B1 | 2/2007 | Marian |
| 7,206,669 | B2 | 4/2007 | Christiansen |
| 7,245,991 | B1 | 7/2007 | Woytowitz |
| 7,248,945 | B2 | 7/2007 | Woytowitz |
| 7,257,465 | B2 | 8/2007 | Perez |
| 7,286,904 | B2 | 10/2007 | Graham |
| 7,289,862 | B2 | 10/2007 | Britton |
| 7,358,626 | B2 | 4/2008 | Gardner |
| 7,359,769 | B2 | 4/2008 | Bailey |
| 7,403,840 | B2 | 7/2008 | Moore |
| 7,421,317 | B2 | 9/2008 | Christiansen |
| 7,444,207 | B2 | 10/2008 | Nickerson |
| 7,458,521 | B2 | 12/2008 | Ivans |
| 7,526,365 | B1 | 4/2009 | Frerich |
| 7,826,931 | B2 | 11/2010 | Lorenz |
| 2002/0035414 | A1 | 3/2002 | Morikawa |
| 2002/0053970 | A1 | 5/2002 | Plummer |
| 2002/0071234 | A1 | 6/2002 | Alexanian |
| 2002/0085333 | A1 | 7/2002 | Alexanian |
| 2002/0088875 | A1 | 7/2002 | Sirkin |
| 2002/0091452 | A1 | 7/2002 | Addink |
| 2002/0166986 | A1 | 11/2002 | Remby |
| 2003/0006882 | A1 | 1/2003 | Buhler |
| 2003/0120393 | A1 | 6/2003 | Bailey |
| 2003/0135286 | A1 | 7/2003 | Brundisini |
| 2003/0179102 | A1 | 9/2003 | Barnes |
| 2003/0201675 | A1 | 10/2003 | Alexanian |
| 2004/0039489 | A1 | 2/2004 | Moore |
| 2004/0046137 | A1 | 3/2004 | Herbert |
| 2004/0086053 | A1 | 5/2004 | Anderson |
| 2005/0004715 | A1 | 1/2005 | Christiansen |
| 2005/0038529 | A1 | 2/2005 | Perez |
| 2005/0055106 | A1 | 3/2005 | Beutler |
| 2005/0156067 | A1 | 7/2005 | Ivans |
| 2005/0156068 | A1 | 7/2005 | Ivans |
| 2005/0264973 | A1 | 12/2005 | Gardner |
| 2005/0273205 | A1 | 12/2005 | Nickerson |
| 2006/0043208 | A1 | 3/2006 | Graham |
| 2006/0080003 | A1 | 4/2006 | Christiansen |
| 2006/0091245 | A1 | 5/2006 | Ivans |
| 2006/0116793 | A1 | 6/2006 | Christiansen |
| 2006/0206239 | A1 | 9/2006 | Christiansen |
| 2007/0035907 | A1 | 2/2007 | Doering |
| 2007/0106426 | A1 | 5/2007 | Ensworth |
| 2007/0179674 | A1 | 8/2007 | Ensworth |
| 2007/0221750 | A1 | 9/2007 | Roberts et al. |
| 2007/0282486 | A1 | 12/2007 | Walker |
| 2008/0027587 | A1 | 1/2008 | Nickerson |
| 2008/0039978 | A1 | 2/2008 | Graham |
| 2008/0058995 | A1 | 3/2008 | Holindrake |
| 2008/0157995 | A1 | 7/2008 | Crist et al. |
| 2008/0211307 | A1 | 9/2008 | Gardner |
| 2008/0275595 | A1 | 11/2008 | Bailey et al. |
| 2008/0288117 | A1 | 11/2008 | Nickerson |
| 2008/0319585 | A1 | 12/2008 | Nickerson |
| 2009/0076659 | A1 | 3/2009 | Ensworth |
| 2009/0120521 | A1 | 5/2009 | Clark et al. |
| 2010/0082169 | A1 | 4/2010 | Crist et al. |
| 2010/0161144 | A1 | 6/2010 | Crist et al. |
| 2011/0015793 | A1 | 1/2011 | Crist et al. |
| 2011/0015800 | A1 | 1/2011 | Crist et al. |
| 2011/0017845 | A1 | 1/2011 | Crist et al. |

FOREIGN PATENT DOCUMENTS

| | | | |
|---|---|---|---|
| WO | WO 86/06579 | A1 | 11/1986 |
| WO | WO 02/058254 | A1 | 7/2002 |

OTHER PUBLICATIONS

Rain Bird, "Tech Specs: Rain Bird Decoders", Oct. 2004, Rain Bird Corporation Golf Division, Tucson, AA. (2 pages).

The Toro Company; "Golf Decoder Control System (GDC)"; Jun. 25, 2007, pp. 1-3, printed from http://web.archive.org/web/20070625035525/www.toro.com/irrigation/golf/1gturffield/gdc/index.html, The Toro Company, Bloomington, MN.

USPTO; U.S. Appl. No. 11/228,413; Office Action Mailed Apr. 2, 2008.

USPTO; U.S. Appl. No. 11/228,413; Office Action Mailed Dec. 2, 2008.

USPTO; U.S. Appl. No. 11/228,413; Examiner Interview Summary Mailed Apr. 22, 2009.

USPTO; U.S. Appl. No. 11/228,413; Office Action Mailed May 20, 2009.

USPTO; U.S. Appl. No. 11/228,413; Examiner Interview Summary Mailed Dec. 7, 2009.

USPTO; U.S. Appl. No. 11/228,413; Office Action Mailed Dec. 7, 2009.

USPTO; U.S. Appl. No. 11/228,413; Notice of Panel Decision from Pre-Appeal Brief Review Mailed Apr. 28, 2010.

USPTO; U.S. Appl. No. 11/228,413; Notice of Allowance Mailed Jun. 18, 2010.

USPTO; U.S. Appl. No. 11/228,413; Supplemental Notice of Allowance Mailed Aug. 5, 2010.

USPTO; U.S. Appl. No. 11/228,413; Supplemental Notice of Allowance Mailed Sep. 2, 2010.

PCT; App. No. PCT/US2010/043273; International Search Report mailed Mar. 2, 2011; 3 pages.

PCT; App. No. PCT/US2010/043273; Written Opinion of the International Searching Authority mailed Mar. 2, 2011; 3 pages.

INTEGRATED ACTUATOR COIL AND DECODER MODULE FOR IRRIGATION CONTROL

This application is a continuation of U.S. application Ser. No. 11/228,413, filed Sep. 15, 2005, which is incorporated herein by reference.

BACKGROUND OF THE INVENTION

1. Field of the Invention

The present invention relates generally to irrigation control devices and more specifically to decoder-based irrigation control system including decoder units for coupling to actuator coil-controlled irrigation equipment.

2. Discussion of the Related Art

Figure 1:
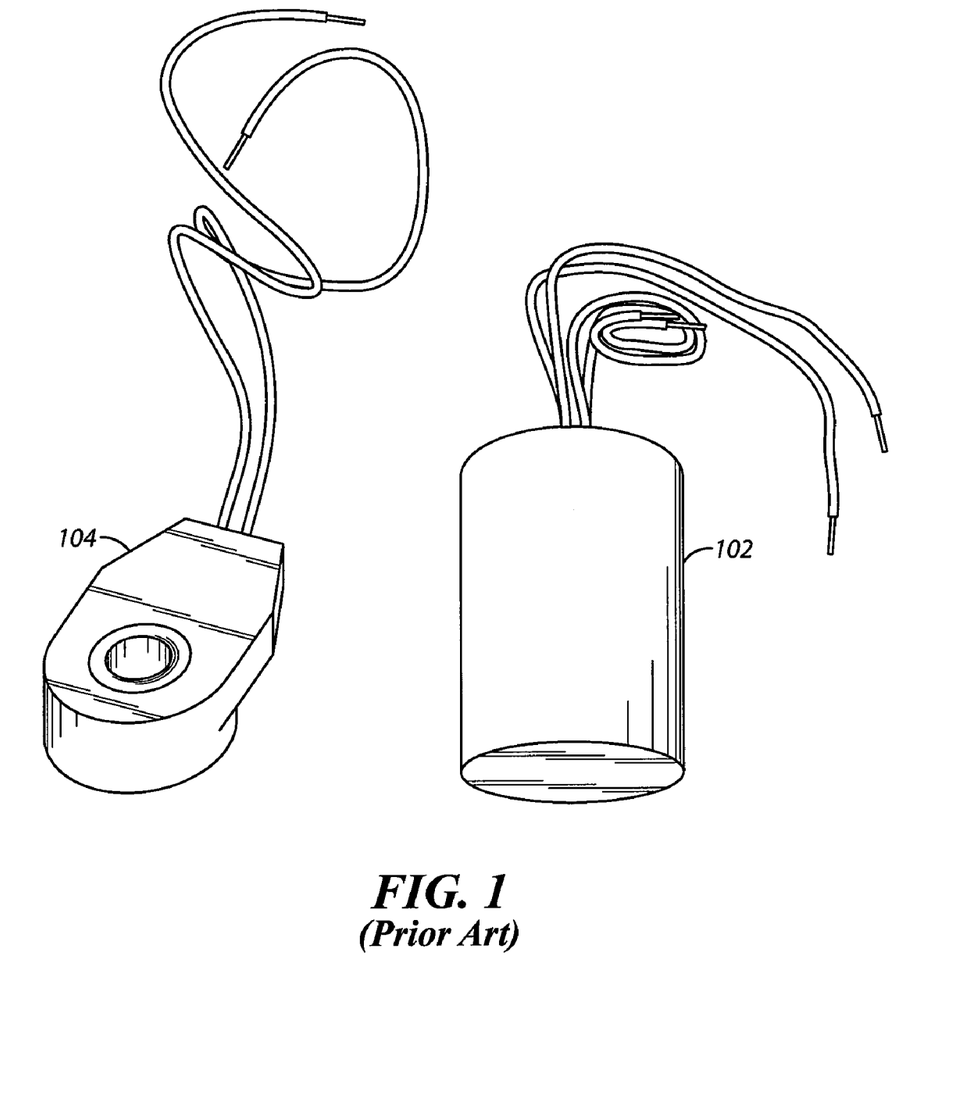
FIG. 1 illustrates a separate sprinkler coil and decoder module for controlling irrigation equipment in a conventional decoder-based irrigation control system.
Figure 2:
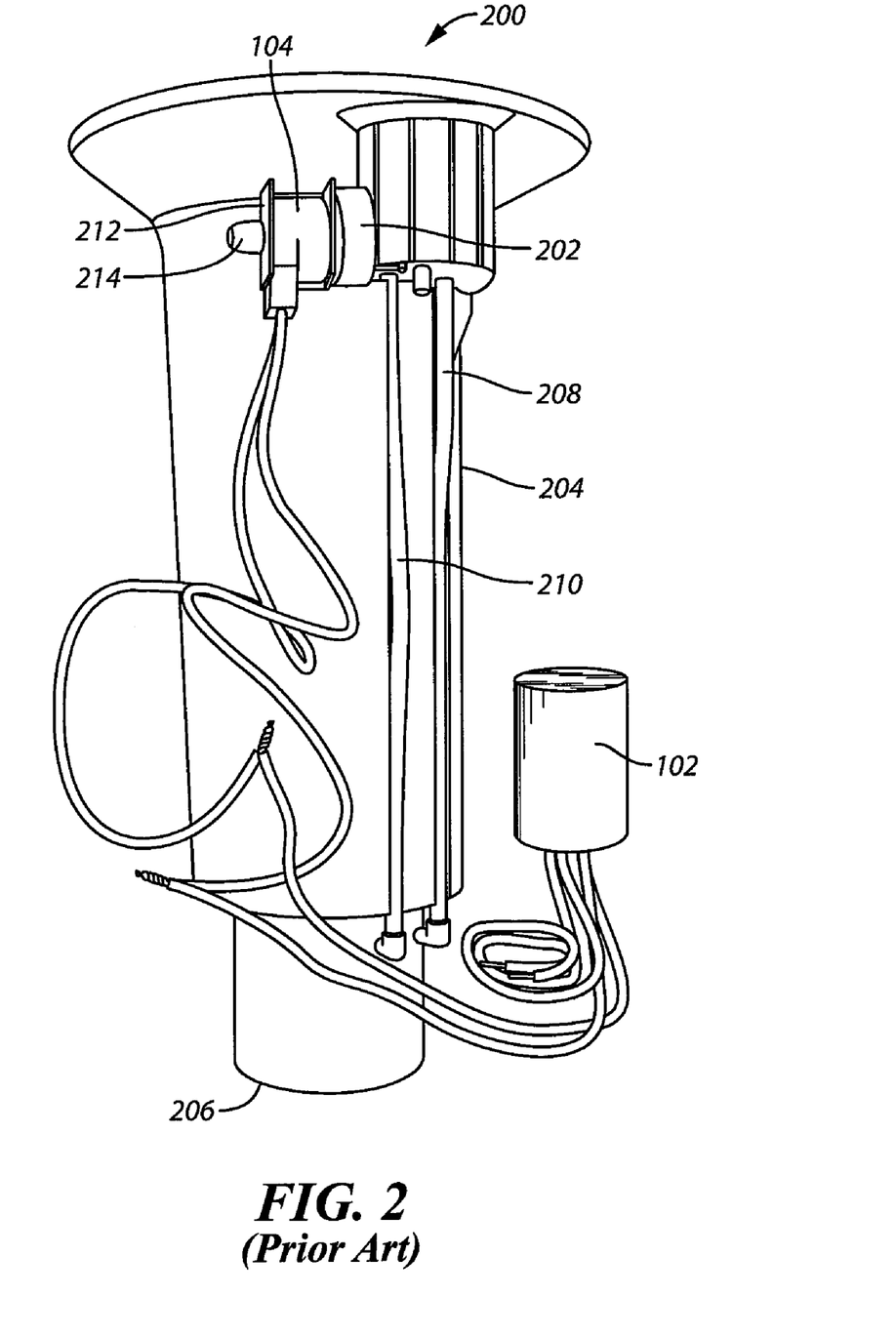
FIG. 2 illustrates a conventional decoder and electric sprinkler application including a separate coil module and decoder module.

In decoder-based irrigation control systems, an irrigation controller sends signaling along a wire path to which one or more decoder devices are attached. Each decoder device monitors transmissions on the wire path and decodes this signaling to determine when to cause irrigation devices coupled thereto to be activated and deactivated. The decoder module typically includes circuitry formed on a printed circuit board located within a housing. Wiring from the decoder module housing must be coupled to the wiring of the wire path as well as coupled to one or more actuator devices each controlling the opening and closing of an irrigation rotor or valve. In one form, the rotor or valve is operated by a solenoid coil as is well known in the art. Likewise, during installation, the operator must provide and electrically connect two separate devices, a decoder module and an actuator coil module, to each other and to the control wire path. FIG. 1 illustrates a separate decoder module 102 and a coil unit 104 that are conventionally coupled together. For example, as illustrated in FIG. 2, for a solenoid activated rotor assembly 200, the coil module 104 is coupled (in part by a bracket 212 and retainer 214) to the parts of a selector valve assembly 202 (including a pressure regulator) attached to a casing assembly 204. The electrical wire inputs to the coil module 104 are then connected to the electrical wire outputs from the decoder module 102, while the electrical wire inputs to the decoder module 102 are coupled to the control wire path from the irrigation controller. Thus, a typical installation requires the connection of six wires to install the decoder module 102 and a coil module 104.

As is well known, in operation, a portion of a plunger (not shown) of the selector valve assembly 202 is disposed within the coil unit 104 while another portion is seated against a solenoid plunge port (not shown) within the selector valve assembly 202 in a normally closed position. In this position, high pressure water flow from a main water control valve (not shown) located within a main control valve portion 206 of the device is flowed up high pressure water line 208 into the selector valve assembly 202 and its regulator and is prevented from further movement by the normally closed position of the plunger against the solenoid port in the selector valve assembly 202. This results in a back pressure that causes the main water control valve to close. In response to signals from the decoder module 102, the coil module 104 causes the actuation of the plunger to move it off of (or unseat from) the solenoid plunge port allowing the high pressure flow in the high pressure line 208 to flow through the selector valve assembly 202 (and its pressure regulator), which relieves the back pressure and allows water to flow through the main control valve and to a pop-up sprinkler device, i.e., the main water control valve is opened. The pop-up sprinkler device is located within the casing assembly 204 and extends upwardly due to the water pressure through a top portion of the casing assembly 204. The high pressure flow exits the selector valve assembly 202 down through a discharge flow line 210 which terminates within the casing assembly 204 at a location downstream of the main water control valve.

SUMMARY OF THE INVENTION

Several embodiments of the invention provide an integrated actuator coil and decoder module for use in decoder-based irrigation control systems.

In one embodiment, the invention can be characterized as an irrigation control device comprising: a body; decoder circuitry located within the body; a coil located within the body and coupled to the decoder circuitry, the coil adapted to develop an electromagnetic flux sufficient to cause actuation of a device controlling irrigation equipment in response to signaling from the decoder circuitry; and an electrical connection coupled to the decoder circuitry and adapted to couple to a control wire path of a decoder-based irrigation control system. The decoder circuitry and the coil are integrated into a single device.

In another embodiment, the invention can be characterized as a method of making an irrigation control device comprising the steps of: providing decoder circuitry; providing a coil unit containing a wire coil adapted to develop an electromagnetic flux sufficient to cause actuation of a device that causes opening and closing of an irrigation valve upon the application of an electrical current to the wire coil; coupling an output of the decoder circuitry to an input of the coil unit; inserting the decoder circuitry into a housing such that an electrical connection to the decoder circuitry can be made from outside of the housing; sealing the decoder circuitry within the housing; sealing at least a portion of the coil unit to the housing, whereby forming an integrated device having both the decoder circuitry and the coil unit.

In a further embodiment, the invention can be characterized as a method of electrically connecting an irrigation control device to a decoder based irrigation control system comprising the steps of: electrically coupling a first control wire of the decoder based irrigation control system to a first electrical connection of an integrated coil and decoder module; and electrically coupling a second control wire of the decoder based irrigation control system to a second electrical connection of the integrated coil and decoder module.

BRIEF DESCRIPTION OF THE DRAWINGS

The above and other aspects, features and advantages of several embodiments of the present invention will be more apparent from the following more particular description thereof, presented in conjunction with the following drawings.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention.

DETAILED DESCRIPTION

The following description is not to be taken in a limiting sense, but is made merely for the purpose of describing the general principles of exemplary embodiments. The scope of the invention should be determined with reference to the claims.

Figure 3:
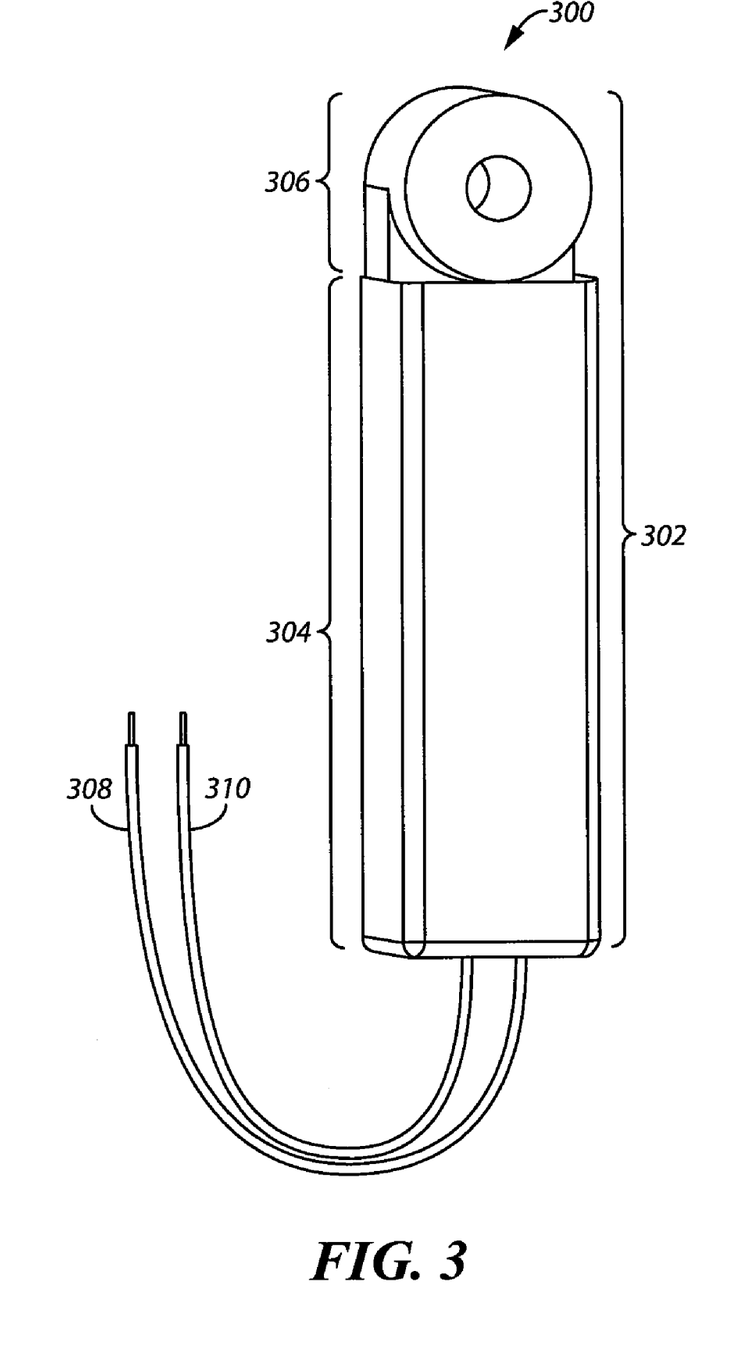
FIG. 3 illustrates an integrated coil and decoder module for use in a decoder-based irrigation control system in accordance with one embodiment of the invention.

Referring first to FIG. 3, a perspective view is shown of an integrated coil and decoder module 300 for use in a decoder-based irrigation control system in accordance with one embodiment of the invention. The integrated coil and decoder module 300 includes a module body 302 (also referred to simply as body 302) including a decoder housing 304 (also referred to as a first housing) and a coil housing 306 (also referred to as a second housing, solenoid housing or coil unit). The module 300 also includes electrical connector wires 308 and 310 (also referred to as electrical connections 308 and 310) extending from the decoder housing 304. The decoder housing 304 includes decoder circuitry (e.g., shown in FIG. 5) and the coil housing 306 includes a wire coil or solenoid (e.g., shown in FIG. 8) formed within. Although the decoder housing 304 and the coil housing 306 are separate functional components, they are integrated together to form a single integrated coil and decoder module 300.

Advantageously, since the module 300 is integrated into a single body 302, an installer need only connect the two electrical connections 308 and 310 to the control wire path of a decoder-based irrigation control system. It is noted that any electrical connections between the decoder circuitry within the decoder housing 304 and the wire coil within the coil housing 306 are already made and sealingly contained within the body 302.

Figure 4:
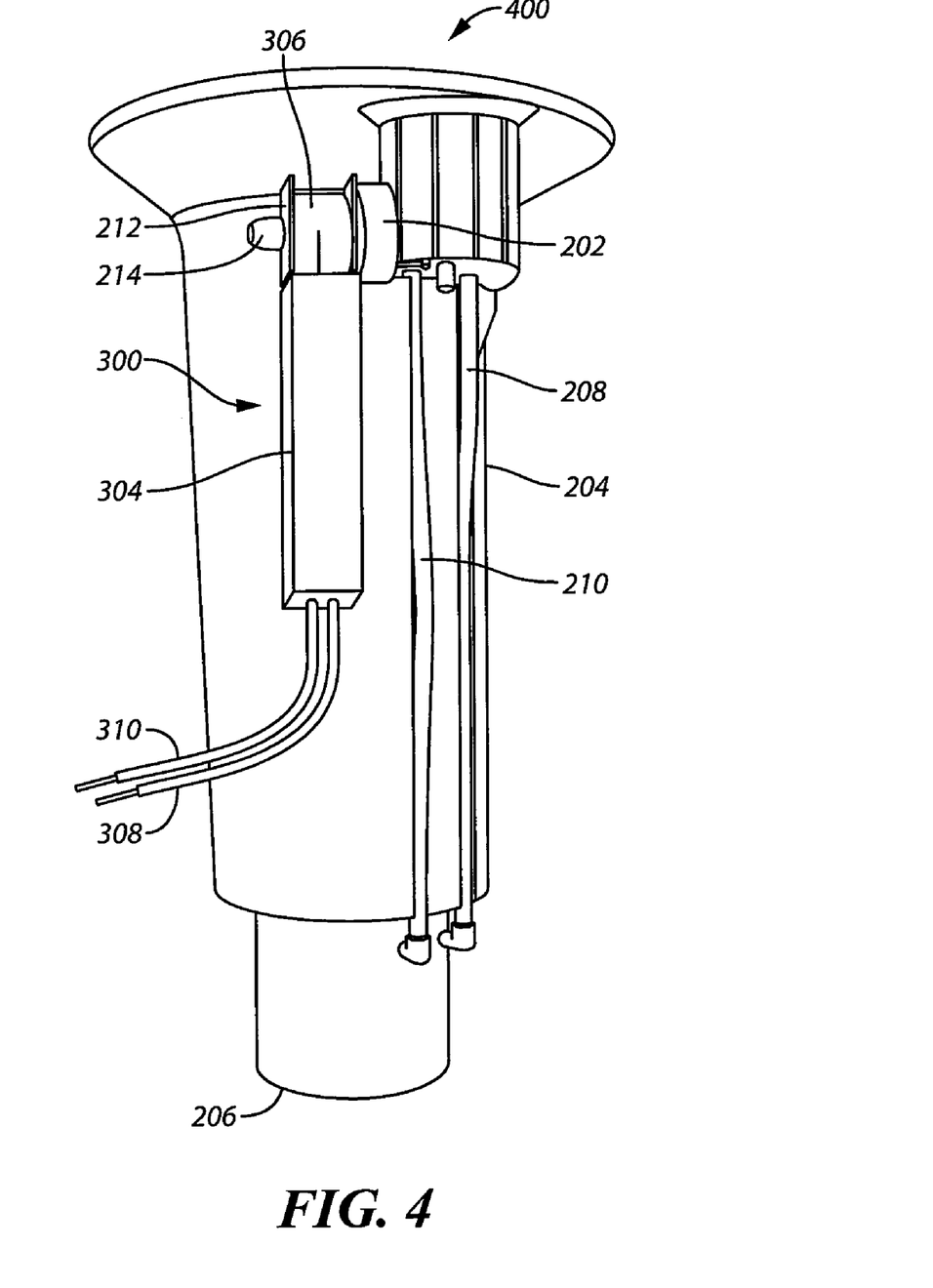
FIG. 4 illustrates a decoder and electric sprinkler application including an integrated coil and decoder module in accordance with several embodiments of the invention.

Referring next to FIG. 4, a perspective view is shown of a decoder and electric sprinkler application including the integrated coil and decoder module 300 of FIG. 3. In this embodiment, in a solenoid activated rotor assembly 400, the coil housing 306 (or solenoid housing) is coupled (in part by the bracket 212 and the retainer 214) to the components of the selector valve assembly 202 attached to the casing assembly 204 (which is typically buried underground or located within a valve box above or below ground). In the illustrated embodiment, the casing assembly 204 contains a pop-up and rotary sprinkler device (not shown). Accordingly, an installation in accordance with this embodiment only involves the connection of two wires (e.g., electrical connections 308 and 310) to install the decoder module 300, as opposed to six wires in the separated decoder module and coil module as illustrated in FIG. 2. Thus, with the new module according to several embodiments of the invention, the task of installing a decoder module and coil unit is simplified since there are fewer wires to connect. Additionally, this embodiment provides a space-saving design that is more streamlined and easier to install with less clutter due to excess wires. Furthermore, the installer only needs to provide and install a single integrated device rather than purchasing and providing a separate decoder module and a separate coil housing module.

In operation, a portion of a plunger (not shown) of the selector valve assembly 202 is disposed within a core tube (not shown) that extends into the opening of the coil housing 306 about which the coil is wound while another portion of the plunger is seated against a solenoid plunge port (not shown) within the selector valve assembly 202 in a normally closed position (e.g., a spring within the core tube holds the plunger against the solenoid plunge port). In this position, high pressure water flow from a main water control valve (not shown) located within a main control valve portion 206 of the device is flowed up high pressure water line 208 into the selector valve assembly 202 and its regulator and is prevented from further movement by the normally closed position of the plunger against the solenoid port in the selector valve assembly 202. This results in a back pressure that causes the main water control valve to close. In response to signals from the decoder housing 304 portion of the integrated coil and decoder module 300, the coil module 306 generates a magnetic field that causes the actuation of the plunger within the core tube to move it off of (or unseat from) the solenoid plunge port allowing the high pressure flow in the high pressure line 208 to flow through the selector valve assembly 202 (and its pressure regulator), which relieves the back pressure and allows water to flow through the main control valve and to a pop-up sprinkler device, i.e., the main water control valve is opened. The high pressure flow exits the selector valve assembly 202 down through a discharge flow line 210 which terminates within the casing assembly 204 at a location downstream of the main water control valve. It is noted that the core tube extends through the bracket 212 and the opening of the coil module 306 such that a portion extends through the back opening of the coil module 306 and back side of the bracket 212. The retainer 214 is preferably a rubber end cap that is positioned over the portion of the core tube extending therethrough to hold the coil module 306 in position against the bracket 212 and the selector valve assembly 202.

Figure 5:
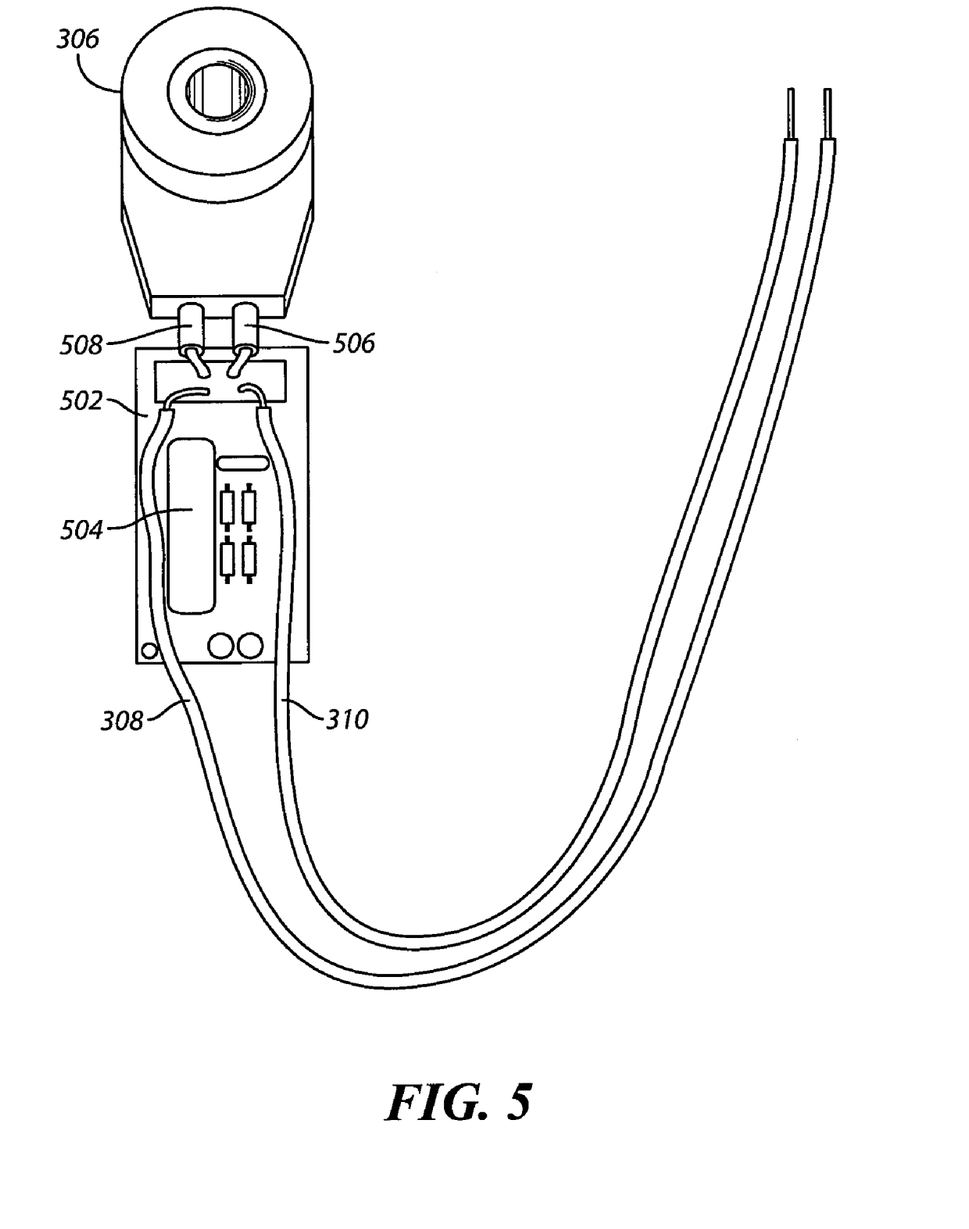
FIG. 5 illustrates decoder circuitry and a coil module of the integrated device of FIG. 3 shown without the decoder housing in accordance with one embodiment of the invention.

Referring next to FIG. 5, a view shown of the decoder circuitry and coil module of the integrated device of FIG. 3 without the decoder housing in accordance with one embodiment of the invention. Illustrated is a printed circuit board 502 including decoder circuitry 504 formed on or otherwise coupled to or attached to the printed circuit board 502. Also illustrated are the electrical connections 308 and 310 coupled to the decoder circuitry 504 for connection to the control wire path of the decoder-based irrigation control system, as well as electrical connections 506 and 508 extending from the decoder circuitry 504 into the coil housing 306 to electrically couple the decoder circuitry 504 to the wire coil of the coil housing 306. It is noted that the decoder circuitry 504, as well as the coil housing 306 including the coil formed within, are well-known in the art. For example, in one embodiment, the decoder circuitry 504 is found within commercial decoder modules available from the Rain Bird Corp., Glendora, Calif., for example, a single channel, single coil decoder (part number FD-101). Likewise, in one embodiment, the coil housing 306 is commercially available from the Rain Bird Corp., Glendora, Calif., as rotor coil, part number 212165.

In accordance with one embodiment, a commercially available coil housing, such as coil housing 306, is electrically coupled to commercially available decoder circuitry, such as decoder circuitry 504, via electrical connections 506 and 508. Such decoder circuitry includes electrical input connections, such as electrical connections 308 and 310 to be coupled to the control wire path of a decoder-based irrigation control system. The decoder circuitry 504 and coil housing 306 are then inserted into a volume (see volume 706 of FIG. 7) formed within a housing, such as the decoder housing 304, such that the electrical connections 308 and 310 extend through at least one opening formed in the decoder housing 304. Generally, a portion of the coil housing 306 extends into the volume formed within the housing 304, while the portion of the coil housing 306 that is adapted to mate to the selector valve assembly 202 extends out of this volume. Next, a sealant material is filled into the remaining volume within the housing 304 in order to hermetically seal the electronic components within the housing as well as to hermetically seal and rigidly seal the coil housing 306 to the decoder housing 304. The sealant material may comprise any suitable potting material, such as an epoxy, that is initially in a liquid or fluid state and filled within the volume, and which hardens or cures with time. In other embodiments, other suitable sealants may be applied to the interface between the decoder housing 304 and the coil housing 306 without filling the volume of the decoder housing. Advantageously, the resulting module 300 is an integrated single device in which the decoder circuitry and the coil housing are rigidly fixed to each other and form a single integrated body 302. This embodiment is easy to construct from commercially available components. However, it is noted that in other embodiments, the coil housing 306 and the decoder housing 304 comprise a single housing that is not required to be coupled or otherwise hermetically sealed to each other. One of ordinary skill in the art could certainly design such a housing. Thus, in such embodiments, the wire coil may be directly electrically coupled to the printed circuit board 502 and the decoder circuitry 504 within the same housing.

Figures 6A, 6B:
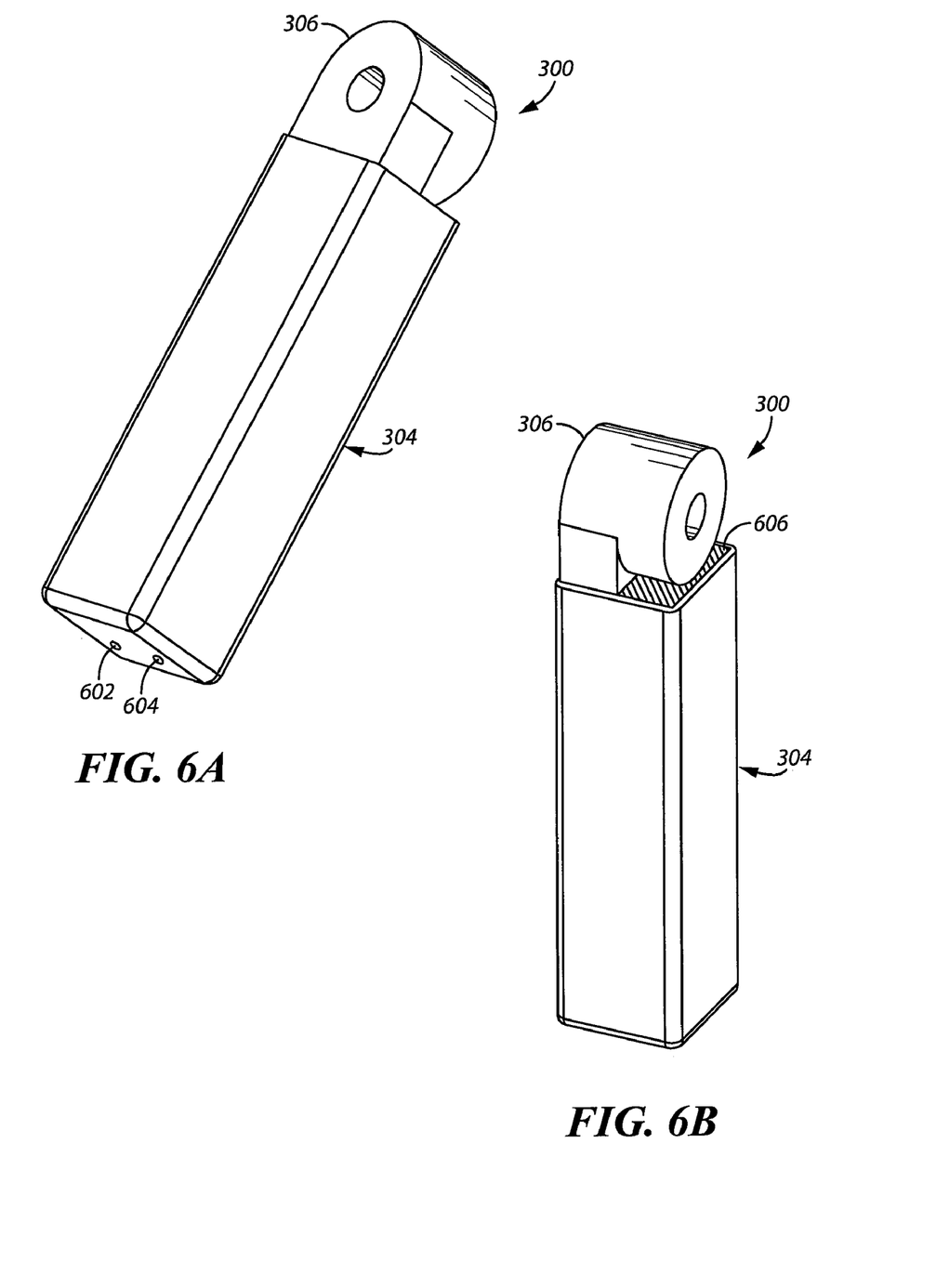
FIGS. 6A and 6B illustrate other views of the integrated coil and decoder module of FIG. 3 in accordance with other embodiments of the invention.

FIG. 6A illustrates a perspective view of the integrated coil and decoder module 300 illustrating one embodiment of connection openings 602 and 604 formed in a bottom wall 704 of the decoder housing 304. In this embodiment, the electrical connections 308 and 310 extend through the openings 602 and 604 as the decoder circuitry 504 is positioned within the housing 304. FIG. 6B illustrates another perspective view of the integrated coil and decoder module 300 illustrating a sealant or potting material 606 filling the interior volume of housing and preventing moisture or other contaminants from entering the housing 304 at the interface between the decoder housing 304 and the coil housing 306 and at the openings 602 and 604. It is noted that in other embodiments, a single opening (as opposed to the two openings 602 and 604), is formed in the decoder housing 304 that any electrical connections extend through, while a suitable sealant or potting material seals the opening.

Figure 7:
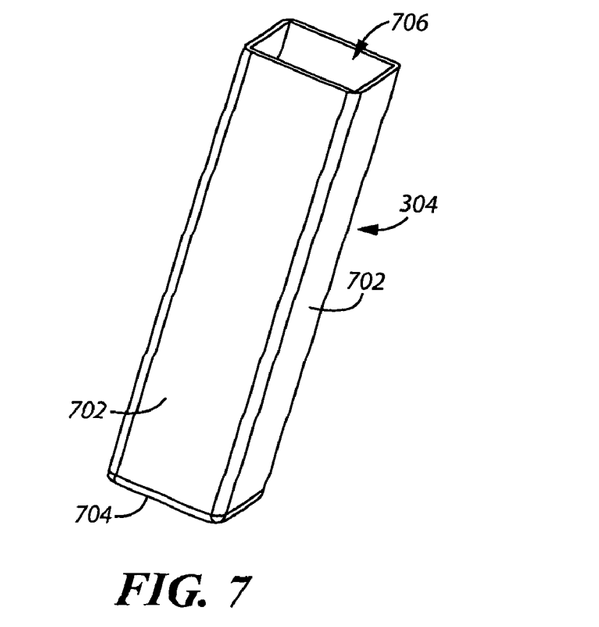
FIG. 7 illustrates the decoder housing of one embodiment of the device of FIG. 3.

Referring next to FIG. 7, a perspective view is shown of the decoder housing 304 of the device of FIG. 3. As illustrated, in preferred form the decoder housing 304 has an elongated rectangular parallelepiped geometry formed by side walls 702 and a bottom wall 704. A top end of the housing 304 is open illustrating a volume 706 formed within and for receiving the decoder circuitry and in some embodiments, at least a portion of the coil housing 306. It is noted that the shape of the decoder housing 304 may take many forms other than that illustrated.

Figure 8:
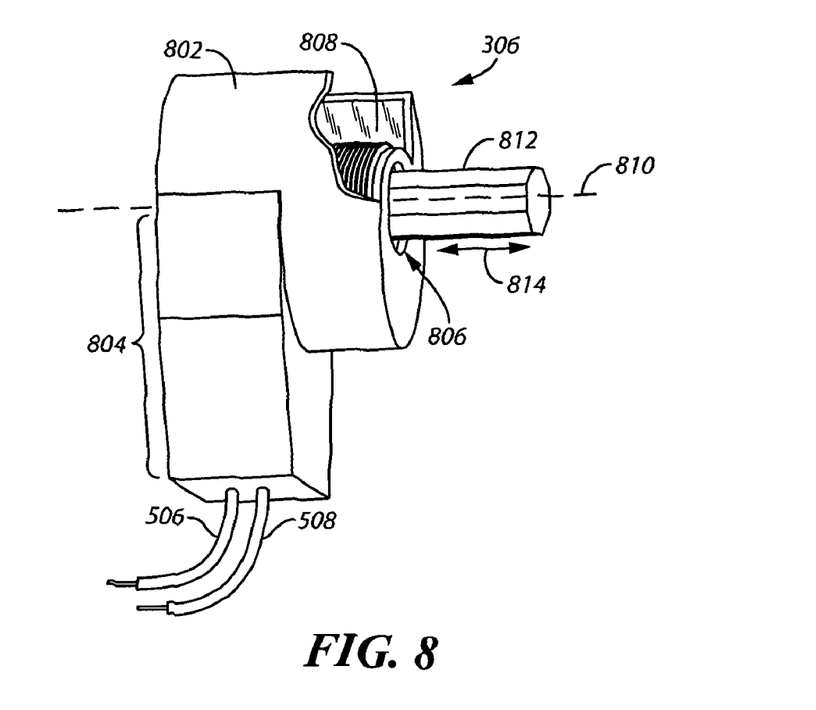
FIG. 8 illustrates a coil housing of one embodiment of the device of FIG. 3 with a partial cutaway showing a wire coil.

Referring next to FIG. 8, a perspective view is shown of the coil housing 306 of the device of FIG. 3 with a partial cutaway view to show the wire coil. The coil housing 306 includes a coil portion 802 (or solenoid portion) and a neck portion 804. In preferred form, a portion of the neck portion 804 extends into the volume 706 formed in the decoder housing 304. However, in other embodiments, coil housing 306 does not extend into the volume but nevertheless is rigidly and sealingly coupled to the decoder housing 306. The coil portion 802 is preferably cylindrically shaped and formed about an opening 806. Thus, the coil portion 802 has an outer cylindrical periphery and an inner concentric cylindrical periphery. The coil portion 802 contains a wire coil 808 or solenoid (shown in the partial cutaway view of FIG. 8) wrapping about the inner periphery and sealingly contained within the walls of the coil portion 802. As is well known in the art, the wire coil 808 wraps about the inner periphery in a coil shape. Upon the application of an electrical current through the wire coil 808, an electromagnetic flux is formed in the opening 806 of the coil portion 802 about a central axis 810 extending through the opening 806. This flux is used to actuate a component 812 or device (such as a plunger) typically moveable along the central axis 810 (e.g., along the path of arrow 814) within the opening 806 of the coil portion 802 in order to cause the opening or closing of a solenoid actuated irrigation valve (e.g., in one embodiment, by opening a valve of a selector valve assembly 202 controlling the solenoid actuate irrigation valve). In preferred form, the component 812 does not contact the inner surfaces of the coil portion 802 in the opening 806 and is metallic and/or magnetic in order to respond to the generated electromagnetic flux. In one example, the component 812 is a plunger contained within a core tube (not shown) that extends through the opening 806 and is coupled to a selector valve assembly (such as selector valve assembly 202 of FIG. 4). The plunger is held in a normally closed position within the core tube by a spring also within the core tube. Upon the application of current to the wire coil 808, the plunger is caused to move within the core tube relative to the coil housing 306 (and wire coil 808) and the core tube to open the selector valve assembly as described above. One end of the core tube extends through the opening 806 to allow a retainer (such as retainer 214) to help hold the coil module or housing 306 in position about the core tube and the selector valve assembly. Such coil housings 306 including the wire coil 806, as well as core tube and plunger assemblies are well-known in the art.

Figure 9:
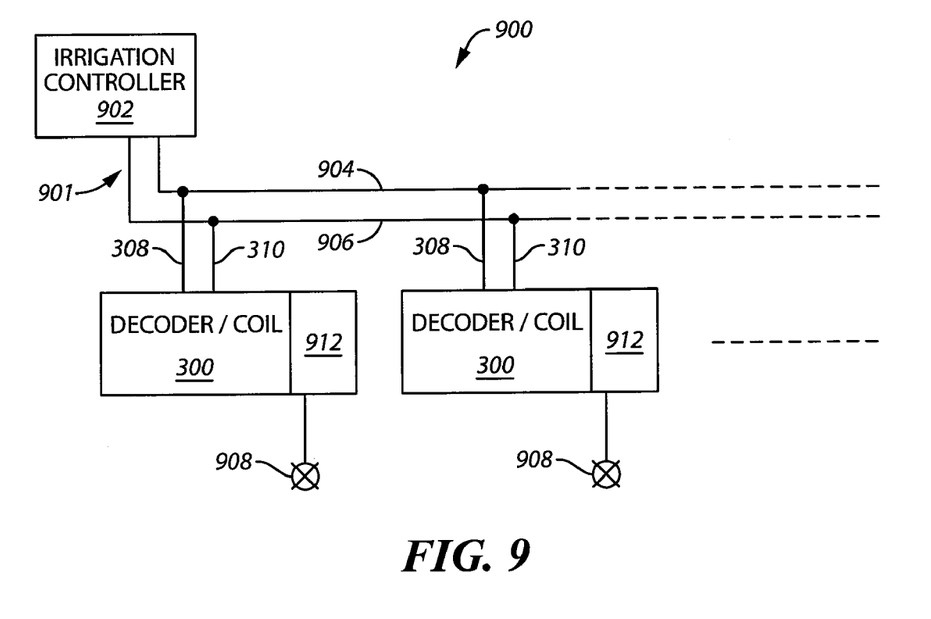
FIG. 9 is a diagram of a decoder-based irrigation control system including multiple integrated coil and decoder modules according to several embodiments of the invention.

Referring next to FIG. 9, one embodiment is shown of a decoder-based irrigation control system 900 including several integrated coil and decoder modules 300 according to several embodiments of the invention. An irrigation controller 902 provides a control wire path 901 extending from the controller 902 into a geographic region where irrigation is desired. The control wire path 901 is typically buried underground. It is understood that multiple separate control wire paths may be output from the controller 902; however, for purposes of illustration, only a single control wire path 901 is shown. Typically, the control wire path 901 includes two wires, a power wire 904 and a common wire 906. A power signal, e.g., 24 volts AC, from the controller 902 is sent on the power line 904 to any connected devices while the common line provides a return to complete the circuit. Generally, the power signal is of sufficient voltage to cause a magnetic flux in the coil housing to open a solenoid activated valve 908. In other words, the electromagnetic flux is sufficient to control irrigation equipment. In a decoder-based system, the power signal is modulated or encoded with data that is readable by the decoder circuitry as is known in the art so that the controller 902 can control multiple irrigation valves using the single control wire path 901.

At various locations in the field, an integrated coil and decoder module 300 according to several embodiments of the invention is directly coupled to the control wire path 901. For example, at various locations in the field, the electrical connections 308 and 310 are coupled to the power line 904 and the common line 906. In one embodiment, the lines and connections are respectively coupled together using twist-on wire connectors and silicon grease to provide water resistant electrical connections. The decoder portion of the integrated coil and decoder module 300 decodes the modulated or encoded power signal on the power line 904 and determines whether or not to provide the power signal (electrical current) to the wire coil of the integrated coil and decoder module 300 (e.g., via electrical connections 506 and 508).

As described above, the wire coil generates a magnetic flux sufficient to cause device of an actuator or solenoid assembly 912 (e.g., in one embodiment, to actuate a plunger of a selector valve assembly 202) to open a normally closed solenoid operated valve 908 (e.g., in one embodiment, a main control valve of a main control valve portion 206), which is coupled to a water supply line on one end and to one or more sprinkler devices on the other end. It is noted that in embodiments implemented in a solenoid activated rotor assembly for a pop-up sprinkler device, that a given integrated coil and decoder module couples to a solenoid operated valve 908 that couples to a single sprinkler device; however, that in other embodiments, the solenoid activate valve 908 may be coupled to multiple sprinkler devices. It is further noted that generally, a sprinkler device may be any rotor device, stationary device, drip device, etc. As is known, there may be multiple integrated coil and decoder modules 300 coupled to the control wire path 901 at various locations. Advantageously, according to several embodiments of the invention, by providing integrated coil and decoder modules 300 instead of separate decoder modules and coil units that must be coupled to each other and to the control wire path, the installation process has been simplified by reducing the number of wires than an installer must connect and by providing a more streamlined design at the casing assembly 204. Additionally, the decoder circuitry and the coil housing form a single rigid and integrated body.

While the invention herein disclosed has been described by means of specific embodiments, examples and applications thereof, numerous modifications and variations could be made thereto by those skilled in the art without departing from the scope of the invention set forth in the claims.

What is claimed is:

1. An irrigation control device comprising:
   a body;
   decoder circuitry located within the body;
   a coil located within the body and coupled to the decoder circuitry, the coil adapted to develop an electromagnetic flux sufficient to cause actuation of a device controlling irrigation equipment in response to signaling from the decoder circuitry; and
   an electrical connection coupled to the decoder circuitry and adapted to couple to a control wire path of a decoder-based irrigation control system,
   wherein the decoder circuitry and the coil are integrated into a single device.

2. The irrigation control device of claim 1 wherein the body comprises:
   a first housing including the decoder circuitry; and
   a second housing including the coil, wherein the first housing and the second housing are integrally coupled together.

3. The irrigation control device of claim 2 wherein a portion of the second housing extends into a volume formed within the first housing.

4. The irrigation control device of claim 2 further comprising a sealant sealing the first housing to the second housing.

5. The irrigation control device of claim 2 wherein the first housing defines a volume containing the decoder circuitry and a portion of the second housing, the device further comprising a material substantially filling the volume and sealing the decoder circuitry and electrical connections to the second housing from external moisture.

6. The irrigation control device of claim 2 wherein the second housing is hermetically sealed and includes a wire connection extending from the second housing to the decoder circuitry.

7. The irrigation control device of claim 1 further comprising an opening in the body and wherein the electrical connection comprises a wire extending from the decoder circuitry through the opening.

8. The irrigation control device of claim 1 wherein the body is watertight.

9. The irrigation control device of claim 1 further comprising a control wire coupled between the decoder circuitry and the coil.

10. The irrigation control device of claim 1 wherein the decoder circuitry is adapted to control a single coil.

11. The irrigation control device of claim 1 wherein the coil comprises a wire coil formed about a volume, an electromagnetic force generated within the volume in response to the application of a current flowing through the wire coil.

12. The irrigation control device of claim 1 wherein the electrical connection comprises:
    a first wire adapted to be coupled to a power signal wire of the decoder-based irrigation control system; and
    a second wire adapted to be coupled to a common signal wire of the decoder-based irrigation control system.

13. The irrigation control device of claim 1 wherein the irrigation control device is configured to be mounted on a sprinkler.

14. The irrigation control device of claim 1 wherein the decoder transmits signals to the coil to cause the electromagnetic flux.

15. The irrigation control device of claim 1 wherein the coil is a part of a coil unit, and the body comprises a housing that covers the decoder circuitry and at least a portion of the coil unit.

16. A method of making an irrigation control device comprising:
    providing decoder circuitry;
    providing a coil unit containing a wire coil adapted to develop an electromagnetic flux sufficient to cause actuation of a device that causes opening and closing of an irrigation valve upon the application of an electrical current to the wire coil;
    coupling an output of the decoder circuitry to an input of the coil unit;
    inserting the decoder circuitry into a housing such that an electrical connection to the decoder circuitry can be made from outside of the housing;
    sealing the decoder circuitry within the housing; and sealing at least a portion of the coil unit to the housing, whereby forming an integrated device having both the decoder circuitry and the coil unit.

17. The method of claim 16 wherein the sealing the at least a portion of the coil unit comprises sealing the at least a portion of the coil unit within the housing.

18. The method of claim 16 wherein the sealing steps further comprise filling the housing with a sealant material.

19. The method of claim 16 wherein the sealing steps further comprise applying a sealant material at an interface between the housing and the coil unit.

20. The method of claim 16 comprising configuring the irrigation control device to be mounted on a sprinkler.

21. The method of claim 16 comprising coupling the decoder circuitry to the coil so that the decoder circuitry outputs the electrical current to the coil to cause the electromagnetic flux.

22. A method of electrically connecting an irrigation control device to a decoder based irrigation control system comprising:

electrically coupling a first control wire of the decoder based irrigation control system to a first electrical connection of an integrated coil and decoder module having a wire coil coupled to decoder circuitry, where the wire coil is adapted to cause actuation of a device controlling irrigation equipment in response to signaling from the decoder circuitry; and electrically coupling a second control wire of the decoder based irrigation control system to a second electrical connection of the integrated coil and decoder module.

23. The method of claim 22 wherein the integrated coil and decoder module includes decoder circuitry and the wire coil integrated into a single body.

24. The method of claim 22 wherein the electrically coupling steps are performed without the need to electrically couple the decoder circuitry to the wire coil.

25. The method of claim 22 wherein the irrigation equipment comprises a sprinkler, and the integrated coil and decoder module is mounted on the sprinkler.

26. The method of claim 22 wherein the integrated coil and decoder module comprises a wire coil coupled to decoder circuitry so that the decoder circuitry transmits signals to the wire coil to cause an electromagnetic flux at the wire coil.

* * * * *